(12) United States Patent
Millar

(10) Patent No.: US 12,547,937 B2
(45) Date of Patent: Feb. 10, 2026

(54) METHOD AND SYSTEM FOR CONSOLIDATING HETEROGENEOUS ELECTRONIC HEALTH DATA

(71) Applicant: Verto Inc., Toronto (CA)

(72) Inventor: Michael Millar, Toronto (CA)

(73) Assignee: Verto Inc., Toronto (CA)

( * ) Notice: Subject to any disclaimer, the term of this patent is extended or adjusted under 35 U.S.C. 154(b) by 805 days.

(21) Appl. No.: 17/915,929

(22) PCT Filed: Apr. 16, 2021

(86) PCT No.: PCT/US2021/027812
§ 371 (c)(1),
(2) Date: Sep. 29, 2022

(87) PCT Pub. No.: WO2021/212063
PCT Pub. Date: Oct. 21, 2021

(65) Prior Publication Data
US 2023/0141049 A1 May 11, 2023

Related U.S. Application Data

(60) Provisional application No. 63/011,962, filed on Apr. 17, 2020.

(51) Int. Cl.
*G06N 20/00* (2019.01)
*G06F 16/25* (2019.01)
(Continued)

(52) U.S. Cl.
CPC .......... *G06N 20/00* (2019.01); *G06F 16/258* (2019.01); *G06F 18/211* (2023.01);
(Continued)

(58) Field of Classification Search
CPC ........ G06N 20/00; G06N 3/0455; G06N 3/09; G06N 3/044; G06N 3/045; G06N 3/048;
(Continued)

(56) References Cited

U.S. PATENT DOCUMENTS

2016/0063209 A1* 3/2016 Malaviya ............... G16H 50/50
706/12
2018/0286500 A1 10/2018 Sole Guerra
(Continued)

FOREIGN PATENT DOCUMENTS

WO 2014/063118 A 4/2014

OTHER PUBLICATIONS

International Search Report issued in corresponding international application No. PCT/US2021/027812 mailed Jul. 20, 2021 (2 pages).
(Continued)

*Primary Examiner* — Sanchita Roy
(74) *Attorney, Agent, or Firm* — Lathrop GPM LLP

(57) ABSTRACT

A method for consolidating heterogenous electronic health data involves obtaining a native message including a multitude of data elements and generating a markup message including the multitude of data elements in a hierarchical structure. The method further involves generating a standardized message that represents the multitude of data elements in a format of a unified electronic health record database by recursively applying a machine learning model to the multitude of data elements, based on the hierarchical structure to determine a mapping between the plurality of data elements in the markup message and the plurality of data elements in the standardized message. The method also involves writing the standardized message to the unified electronic health record database.

16 Claims, 16 Drawing Sheets

(51) Int. Cl.
  *G06F 18/211* (2023.01)
  *G06F 40/143* (2020.01)
  *G16H 10/60* (2018.01)
  *G06F 40/205* (2020.01)

(52) U.S. Cl.
  CPC ........... *G06F 40/143* (2020.01); *G16H 10/60* (2018.01); *G06F 40/205* (2020.01)

(58) Field of Classification Search
  CPC .. G06N 3/08; G06N 5/01; G06N 7/01; G06N 20/20; G06F 16/258; G06F 18/211; G06F 40/143; G06F 40/205; G16H 10/60
  See application file for complete search history.

(56) References Cited

U.S. PATENT DOCUMENTS

| | | | |
|---|---|---|---|
| 2018/0294047 A1 | 10/2018 | Hosseini | |
| 2019/0287662 A1 | 9/2019 | Hennie et al. | |
| 2019/0384849 A1* | 12/2019 | Sundararaman | G16H 30/20 |
| 2019/0392928 A1 | 12/2019 | Hosseini et al. | |
| 2020/0066392 A1* | 2/2020 | Bess | G06N 20/00 |

OTHER PUBLICATIONS

Written Opinion of the International Searching Authority issued in corresponding international application No. PCT/US2021/027812 mailed Jul. 20, 2021 (8 pages).

Pathak, J. et al., "Normalization and Standardization of Electronic Health Records for High-Throughput Phenotyping: the SHARPn Consortium"; Journal of the American Medical Informatics Association, 20 (E2), Nov. 5, 2013 (8 pages).

Rubi, J.N.S et al., "IoMT Platform for Pervasive Healthcare Data Aggregation, Processing, and Sharing Based on OneM2M and OpenEHR", Published in Journal, Sensors, Oct. 3, 2019 (25 pages).

Australian Examination Report for Australian Serial No. 2021255731, mailed Oct. 10, 2023, 8 pages.

Extended European Search Report for Application No. 21789061.5, mailed on Apr. 15, 2024, 12 pages.

Australian Examination Report No. 2 for Application No. 2021255731, mailed May 7, 2024, 4 pages.

Australian Examination report No. 3 for Standard Patent Application for Australian Application Serial No. 2021255731, mailed Sep. 5, 2024, 4 pages.

Canadian Office Action for Canadian Application Serial No. 3,179510, mailed Apr. 22, 2024, 8 pages.

Shang, et al., "The Development of an Aggregated Electronic Health Record in Compliance with Consolidated Clinical Document Architecture", May 19, 2019, 7 pages.

* cited by examiner

500A
Comma Separated Value (CSV) Native Message

ID,BIRTHDATE,DEATHDATE,SSN,DRIVERS,PASSPORT,PREFIX,FIRST,LAST,SUFFIX,MAIDEN,MARITAL,RACE,ETHNICITY,GENDER,BIRTHPLACE,ADDRESS
bd2a6c0f-c87b-4751-b3fe-6ff79deeb1e0,2017-11-07,,999-42-7595,,,,Richelle643,Pfannerstill249,,,,asian,chinese,F,Dedham MA US,852 Brown Highway Suite 908 Boston MA 02137 US

510A
Markup Message

```
<?xml version="1.0" encoding="UTF-8"?>
<root>
 <row>
   <ID>bd2a6c0f-c87b-4751-b3fe-6ff79deeb1e0</ID>
   <BIRTHDATE>2017-11-07</BIRTHDATE>
   <DEATHDATE></DEATHDATE>
   <SSN>999-42-7595</SSN>
   <DRIVERS></DRIVERS>
   <PASSPORT></PASSPORT>
   <PREFIX></PREFIX>
   <FIRST>Richelle643</FIRST>
   <LAST>Pfannerstill249</LAST>
   <SUFFIX></SUFFIX>
   <MAIDEN></MAIDEN>
   <MARITAL></MARITAL>
   <RACE>asian</RACE>
   <ETHNICITY>chinese</ETHNICITY>
   <GENDER>F</GENDER>
   <BIRTHPLACE>Dedham MA US</BIRTHPLACE>
   <ADDRESS>852 Brown Highway Suite 908 Boston MA 02137 US</ADDRESS>
 </row>
</root>
```

*FIG. 5A*

500C
HL7 Native Message

MSH|^~\\
&|MEDITECH|KGH|RIGHTPATH|BAYSHORE|20190226093050||ADT^A03^ADT_A03|||2.5.1
EVN||20190130132321|20190130130000
PID|||bd2a6c0f-c87b-4751-b3fe-6ff79deeb1e0||Pfannerstill249^Richelle643||20171107000000|F||asian|852 Brown Highway Suite 908 Boston MA 02137 US||^^^^555^5552004||ENGLISH|MARRIED|||999427595||||||chinese|

FIG. 5C1

510C
Markup Message

```xml
<?xml version="1.0" ?>
<msh>
    <field_separator>
        <st>\|F|\</st>
    </field_separator>
    <encoding_characters>
        <st>\S\|\R\|\E\|\T\|\</st>
    </encoding_characters>
    <sending_application>
        <namespace_id>
            <is>MEDITECH</is>
        </namespace_id>
    </sending_application>
    <sending_facility>
        <namespace_id>
            <is>KGH</is>
        </namespace_id>
    </sending_facility>
    <receiving_application>
        <namespace_id>
            <is>RIGHTPATH</is>
        </namespace_id>
    </receiving_application>
    <receiving_facility>
        <namespace_id>
            <is>BAYSHORE</is>
        </namespace_id>
    </receiving_facility>
    ...
    <date_time_of_message>
        <time>
            <dtm>20190226093050</dtm>
        </time>
    </date_time_of_message>
    <message_type>
        <message_code>
            <id>ADT</id>
        </message_code>
        <trigger_event>
            <id>A03</id>
        </trigger_event>
        <message_structure>
            <id>ADT_A03</id>
        </message_structure>
    </message_type>
    <version_id>
        <version_id>
            <id>2.5.1</id>
        </version_id>
    </version_id>
</msh>
```

*FIG. 5C2*

500D1
HL7 FHIR Message

```
{
  "type": "collection",
  "entry": [
    {
      "fullUrl": "urn:uuid:ecdaa313-efc9-4080-aee1-aa212271ddbf",
      "resource": {
        "id": "ecdaa313-efc9-4080-aee1-aa212271ddbf",
        "meta": {
          "profile": [
            "http://standardhealthrecord.org/fhir/StructureDefinition/shr-demographics-PersonOfRecord"
          ]
        },
        "text": {
          "status": "generated",
          "div": "<div xmlns=\"http://www.w3.org/1999/xhtml\">Generated by <a href=\"https://github.com/synthetichealth/synthea\">Synthea</a>. Version identifier: 368ac389f34cd3ce3986aa3a0a08e467bf574db3</div>"
        },
        "extension": [
          {
            "url": "http://hl7.org/fhir/us/core/StructureDefinition/us-core-race",
            "valueCodeableConcept": {
              "coding": [
                {
                  "system": "http://hl7.org/fhir/v3/Race",
                  "code": "2028-9",
                  "display": "Asian"
                }
              ],
              "text": "race"
            }
          },
          {
            "url": "http://hl7.org/fhir/us/core/StructureDefinition/us-core-ethnicity",
            "valueCodeableConcept": {
              "coding": [
                {
                  "system": "http://hl7.org/fhir/v3/Ethnicity",
                  "code": "2186-5",
                  "display": "Nonhispanic"
                }
              ],
              "text": "ethnicity"
            }
          },
          {
            "url": "http://hl7.org/fhir/StructureDefinition/birthPlace",
            "valueAddress": {
              "city": "Dedham",
              "state": "MA",
              "country": "US"
            }
          },
          ...
```

FIG. 5D1

500D2
HL7 FHIR Message

```
...
    {
      "url": "http://hl7.org/fhir/StructureDefinition/patient-mothersMaidenName",
      "valueString": "Brenda490 Schimmel662"
    },
    {
      "url": "http://hl7.org/fhir/us/core/StructureDefinition/us-core-birthsex",
      "valueCode": "F"
    },
    {
      "url": "http://hl7.org/fhir/StructureDefinition/patient-interpreterRequired",
      "valueBoolean": false
    },
    {
      "url": "http://standardhealthrecord.org/fhir/StructureDefinition/shr-actor-FictionalPerson-extension",
      "valueBoolean": true
    },
    {
      "url": "http://standardhealthrecord.org/fhir/StructureDefinition/shr-demographics-FathersName-extension",
      "valueHumanName": {
        "text": "Harris330 Pfannerstill249"
      }
    },
    {
      "url": "http://standardhealthrecord.org/fhir/StructureDefinition/shr-demographics-SocialSecurityNumber-extension",
      "valueString": "999-42-7595"
    }
  ],
  "identifier": [
    {
      "system": "https://github.com/synthetichealth/synthea",
      "value": "c43d8be0-cb36-43ea-aaae-a76cabfccb7d"
    },
    {
      "type": {
        "coding": [
          {
            "system": "http://hl7.org/fhir/identifier-type",
            "code": "SB"
          }
        ]
      },
      "system": "http://hl7.org/fhir/sid/us-ssn",
      "value": "999427595"
    },
    {
      "type": {
        "coding": [
          {
            "system": "http://hl7.org/fhir/v2/0203",
            "code": "MR"
          }
        ]
      },
      "system": "http://hospital.smarthealthit.org",
      "value": "c43d8be0-cb36-43ea-aaae-a76cabfccb7d"
    }
  ],
...
```

*FIG. 5D2*

500D3
HL7 FHIR Message

```
...
    "name": [
      {
        "use": "official",
        "family": "Pfannerstill249",
        "given": [
          "Richelle643"
        ]
      }
    ],
    "telecom": [
      {
        "system": "phone",
        "value": "864-009-1257",
        "use": "home"
      }
    ],
    "gender": "female",
    "birthDate": "2017-11-07",
    "address": [
      {
        "extension": [
          {
            "extension": [
              {
                "url": "latitude",
                "valueDecimal": 42.32249056432579
              },
              {
                "url": "longitude",
                "valueDecimal": -70.92749149361198
              }
            ],
            "url": "http://hl7.org/fhir/StructureDefinition/geolocation"
          }
        ],
        "line": [
          "852 Brown Highway",
          "Suite 908"
        ],
        "city": "Boston",
        "state": "MA",
        "postalCode": "02137",
        "country": "US"
      }
    ],
    "maritalStatus": {
      "coding": [
        {
          "system": "http://hl7.org/fhir/v3/MaritalStatus",
          "code": "S"
        }
      ],
      "text": "Never Married"
    },
...
```

*FIG. 5D3*

```
                    500D4
                HL7 FHIR Message

...
    "multipleBirthBoolean": false,
    "communication": [
      {
        "language": {
          "coding": [
            {
              "system": "http://hl7.org/fhir/ValueSet/languages",
              "code": "en-US",
              "display": "English (United States)"
            }
          ]
        }
      }
    ],
    "generalPractitioner": [
      {
        "reference": "urn:uuid:94bec074-5c4b-440c-ba5e-409cd9a896a6"
      }
    ],
    "resourceType": "Patient"
   }
  },
 ],
 "resourceType": "Bundle"
}
```

*FIG. 5D4*

500E
HTML Native Message

```xml
<?xml version="1.0" encoding="UTF-8"?>
<root>
  <entry>
    <element>
      <fullUrl>urn:uuid:ecdaa313-efc9-4080-aee1-aa212271ddbf</fullUrl>
      <resource>
        <address>
          <element>
            <city>Boston</city>
            <country>US</country>
            <extension>
              <element>
                <extension>
                  <element>
                    <url>latitude</url>
                    <valueDecimal>42.32249</valueDecimal>
                  </element>
                  <element>
                    <url>longitude</url>
                    <valueDecimal>-70.92749</valueDecimal>
                  </element>
                </extension>
                <url>http://hl7.org/fhir/StructureDefinition/geolocation</url>
              </element>
            </extension>
            <line>
              <element>852 Brown Highway</element>
              <element>Suite 908</element>
            </line>
            <postalCode>02137</postalCode>
            <state>MA</state>
          </element>
        </address>
        <birthDate>2017-11-07</birthDate>
        <communication>
          <element>
            <language>
              <coding>
                <element>
                  <code>en-US</code>
                  <display>English (United States)</display>
                  <system>http://hl7.org/fhir/ValueSet/languages</system>
                </element>
              </coding>
            </language>
          </element>
        </communication>
...
```

*FIG. 5E*

METHOD AND SYSTEM FOR CONSOLIDATING HETEROGENEOUS ELECTRONIC HEALTH DATA

BACKGROUND

Healthcare environments produce enormous amounts of data in heterogenous data formats. The data may include patient demographics, diagnostic and therapeutic data, billing-related data, etc. Some of these data may be provided in a structured form, whereas other data may be partially or completely unstructured. The data may further originate from different data sources such as hospitals and other medical providers, medical devices, etc. In addition, the data may need to be accessible by different users to varying degrees. For example, a clinician may be authorized to access a patient's demographics, diagnostic and therapeutic data, whereas and administrative user may have access to the patient demographics and billing information only. The heterogenous nature of data in healthcare environments makes the exchange of healthcare data error prone, difficult and time-consuming With healthcare being increasingly data-driven, these challenges are likely to limit the efficiency and effectiveness of the entire healthcare sector.

SUMMARY

In general, in one aspect, one or more embodiments of the disclosure relate to a method for consolidating heterogenous electronic health data, the method comprising: obtaining a native message comprising a plurality of data elements; generating a markup message comprising the plurality of data elements in a hierarchical structure; generating a standardized message that represents the plurality of data elements in a format of a unified electronic health record database by: recursively applying a machine learning model to the plurality of data elements, based on the hierarchical structure to determine a mapping between the plurality of data elements in the markup message and the plurality of data elements in the standardized message; and writing the standardized message to the unified electronic health record database.

In general, in one aspect, one or more embodiments of the disclosure relate to a system for consolidating heterogenous electronic health data, the system comprising: a computer processor configured to perform operations comprising: obtaining a native message comprising a plurality of data elements; generating a markup message comprising the plurality of data elements in a hierarchical structure; generating a standardized message that represents the plurality of data elements in a format of a unified electronic health record database by: recursively applying a machine learning model to the plurality of data elements, based on the hierarchical structure to determine a mapping between the plurality of data elements in the markup message and the plurality of data elements in the standardized message; and writing the standardized message to the unified electronic health record database.

In general, in one aspect, one or more embodiments of the disclosure relate to a non-transitory computer readable medium including computer readable program code for causing a computer system to: obtain a native message comprising a plurality of data elements; generate a markup message comprising the plurality of data elements in a hierarchical structure; generate a standardized message that represents the plurality of data elements in a format of a unified electronic health record database by: recursively applying a machine learning model to the plurality of data elements, based on the hierarchical structure to determine a mapping between the plurality of data elements in the markup message and the plurality of data elements in the standardized message; and write the standardized message to the unified electronic health record database.

Other aspects of the disclosure will be apparent from the following description and the appended claims.

BRIEF DESCRIPTION OF DRAWINGS

FIG. 5A shows a Comma Separated Value (CSV) native message and a markup message, in accordance with one or more embodiments of the disclosure.

FIGS. 5C1 and 5C2 show a Health Level 7 (HL7) native message and a markup message, in accordance with one or more embodiments of the disclosure.

FIGS. 5D1, 5D2, 5D3, and 5D4 show an HL7 Fast Healthcare Interoperability Resources (FHIR) native message, in accordance with one or more embodiments of the disclosure.

FIG. 5E shows a partial Hypertext Markup Language (HTML) native message, in accordance with one or more embodiments of the disclosure.

DETAILED DESCRIPTION

Figure 1:
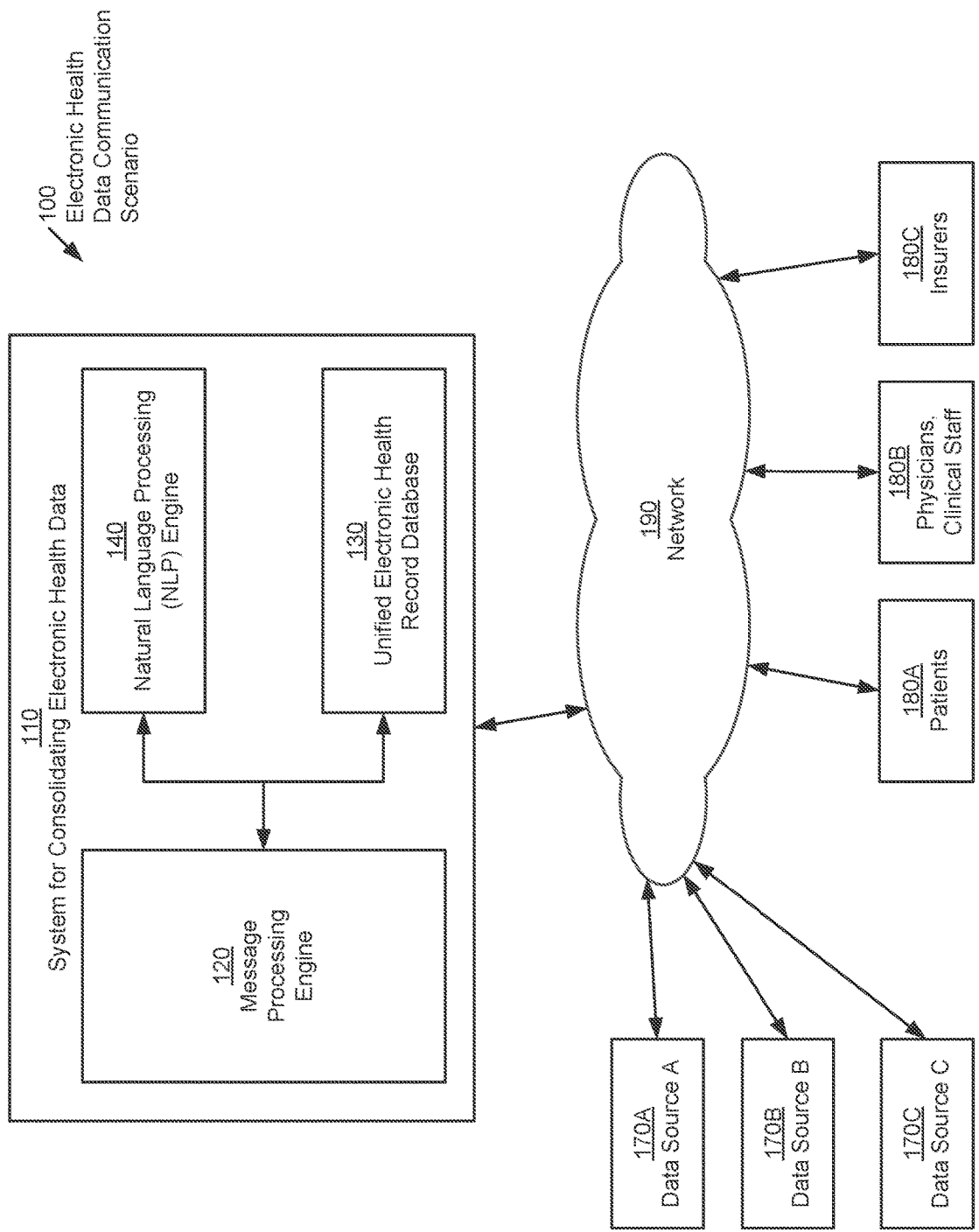
FIG. 1 shows an electronic health data communication scenario, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide method(s) and system(s) for consolidating heterogenous electronic health data. In the healthcare sector, different data sources provide data in heterogenous data formats. Even data associated with a single patient may be complex and from a diverse set of sources. For example, lab test results may be provided in one format by a lab testing facility; imaging data may be provided in a specific image format by a radiology department of a hospital; in addition, the patient's primary physician may provide handwritten and scanned notes from a physical exam. Further, additional medical and non-medical information may be associated with work performed by a hospital's accounting depathnent, an insurance provider, etc. Because all these data may be provided in native formats, the data are unlikely to be easily combinable to form a comprehensive electronic health record for the patient. In addition, the format of the data being provided may initially be unknown, thus further complicating the effort of generating a comprehensive electronic health record for the patient.

In one or more embodiments, native messages from multiple data sources are combined in a unified electronic medical record database. When receiving a native message from a data source, the message, in one or more embodiments, is translated into a standard message compatible with the unified electronic medical record database. To perform the translation, a mapping may need to be established between elements of the native message and the corresponding elements of the standardized message. In one or more embodiments, the mapping is established during an initial training phase, when a new data source becomes available. During the training phase, numerous native messages may be analyzed using methods of statistics and/or machine learning to identify a mapping between elements of the native message and elements of the standardized message. Using this approach, many mappings may be established without requiring manual intervention by a supervisor. A supervisor may, however, manually set mappings for those elements for which mappings could not be automatically determined, or where a confidence associated with the mappings was low. After completion of the training phase, native messages provided by the newly-added data source may be automatically translated into standardized messages to enter the data received from the newly-added source into the unified electronic medical record database.

The described addition of a new data source may be performed for various types of data sources, providing data in various native message formats. Comprehensive electronic health records in a uniform format may, thus, become available. Accordingly, the workflow of healthcare operations may improve by improving efficiency and effectiveness while reducing errors. Many applications, as further discussed below, may benefit from the availability of a unified electronic health record database. For an increasingly data-driven healthcare, the availability of the unified electronic health record database may be essential.

Turning to FIG. 1, an electronic health data communication scenario (100), in accordance with one or more embodiments, is shown. The electronic health data communication scenario (100) includes a system for consolidating electronic health data (110), at least one data source (170A-170C), and at least one user (180A-180C) connected by a network (190). Each of these elements is subsequently described.

The electronic health data communication scenario (100) may rely on the system for consolidating electronic health data (110) to provide the users (180A-180C) with access to electronic health data obtained from the various data sources (170A-170C).

The users (180A-180C) may be, for example, patients (180A), physicians and/or other clinical staff (180B), insurers (180C), etc. Any type of user benefitting from electronic health data may be participating. Further, any number of users of any type may be participating. The users may interact with the system for consolidating electronic health data (110) by retrieving electronic health data, editing electronic health data, entering electronic health data, etc. Users (180A-180C) may interact with the system for consolidating electronic health data (110) via the data sources (170A-170C), e.g., hospitals, devices, laboratories, etc., as subsequently described.

The data sources (170A-170C) may be hospitals, laboratories, individual devices (e.g., imaging devices, heart monitors, blood glucose meters), or any other component capable of providing electronic health data. Any type and any number of data sources (170A-170C) may participate in the electronic health data communication scenario (110). The data sources (170A-170C) may communicate using any type of communication standard as further discussed below.

The system for consolidating electronic health data (110), in accordance with one or more embodiments, includes a unified electronic health record database (130), configured to store electronic health data received from the data sources (170A-170C). the unified electronic health record database (130) is implemented using a standard capable of accommodating any kind of electronic health data from the various data sources (170A). For example, a first set of data may include lab test results, a second set of data may include medical images, and a third set of data may include insurance information. The unified electronic health record database (130) may consolidate all these heterogenous data to establish comprehensive electronic health records for patients. The consolidation of electronic health data received from the data sources (170A-170C) may be performed by the message processing engine (120). A detailed description of the message processing engine (120) and the unified electronic health record database (130) is provided below with reference to FIG. 2.

In one embodiment, the system for consolidating electronic health record data (110) further includes a natural language processing engine (140) which may be used to extract information from unstructured native messages (free text), for example by annotating biomedical concepts such as symptoms, procedures, medications, diagnoses with attributes/standard codes. The annotations may be performed using a unified medical language system dictionary set (UMLS) and/or the clinical Text Analysis Knowledge Extraction System (cTAKES). The system for consolidating electronic health record data (110) may be implemented on one or more computing systems, such as those shown in FIGS. 8A and 8B.

The network (190) may interface the system for consolidating electronic health data (110) with the data sources (170A-170C) and the users (180A-180C). Any combination of wired and/or wireless communication protocols may be used by the network (190). Further, the network (190) may include wide area network (e.g. the Internet) segments, and/or a local area network segments (e.g. enterprise networks). Communications over the network (190) may involve any combination of secured (e.g., encrypted) and non-secure (e.g., un-encrypted) communication. For example, secure site-to-site VPN tunnels, cryptographic protocols such as TLS or SSL, etc. may be used by any of the components shown in FIG. 1. The network (190) may, thus, enable or facilitate data sharing between the data sources (170A-170C) and the system for consolidating electronic health data (110). Details regarding methods and protocols used for the data sharing are provided below Turning to FIG. 2, a message intake configuration (200), in accordance with one or more embodiments, is shown. The message intake configuration (200) may be used, for example, to perform an automatic outbound integration of heterogeneous electronic health data from a hospital network (e.g., data sources (170)) to the unified electronic health record database (130). The electronic health data may be received in batches that have been accumulated over time or in the form of individual messages, in real-time. The message intake configuration may include the data sources (170), the unified electronic health record database (130), the message processing engine (220), the model traits (238), and the field mappings (240). Each of these elements is subsequently described.

The data sources (170) may include various types of data sources (172A-172E) that may send native messages (202A-202E) to the message processing engine (220). The native messages (202A-202E) may be sent by the corresponding sources (172A-172E) over time or in batches. A data source may be, for example, a hospital, a laboratory, an individual device, or any other data source capable of providing electronic medical data. The data sources may be associated with any kind of clinical, non-clinical, administrative, operations, etc.

The data sources (170) may include one or more data sources (172A) that output data using native messages (202A) in a format, such as delimiter-separated values (DSV). An example of a native message (202A) is provided in FIG. 5A. The processing of the native message (202A) is discussed below.

Figure 5B:
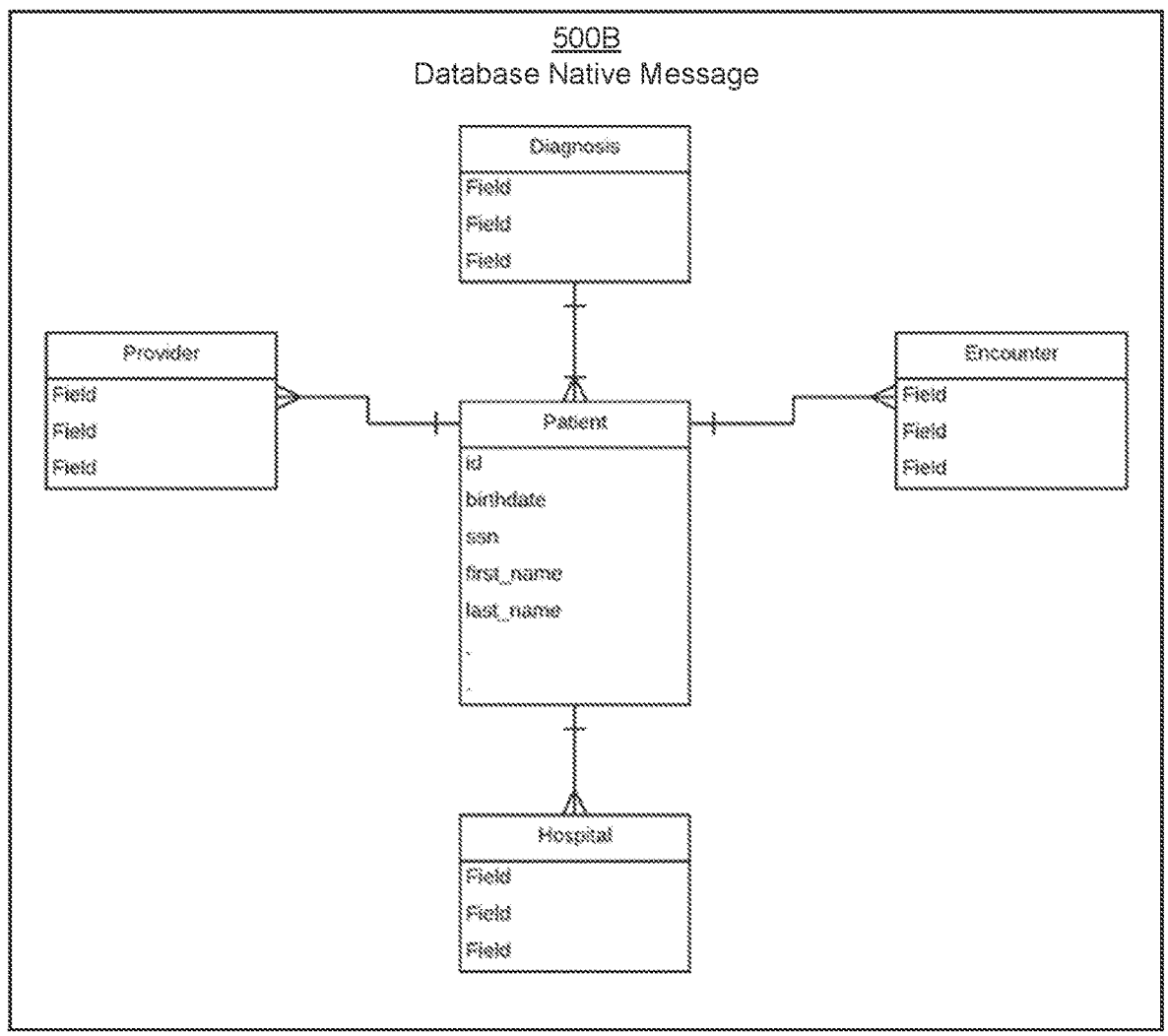
FIG. 5B schematically shows a database native message, in accordance with one or more embodiments of the disclosure.

The data sources (170) may include one or more data sources (172B) that output data using native messages (202B) in a database or table format. An example of a native message (202B) is schematically shown in FIG. 5B. The processing of the native message (202B) is discussed below.

The data sources (170) may include one or more data sources (172C) that output data using native messages (202C) in the Health Level 7 (HL7) format, e.g., in an HL7 v2.x format. An example of a native message (202C) is schematically shown in FIG. 5C1. The processing of the native message (202C) is discussed below.

The data sources (170) may include one or more data sources (172D) that output data using native messages (202D) in an HL7 Fast Healthcare Interoperability Resources (FHIR) format. An example of a native message (202D) is schematically shown in FIGS. 5D1, 5D2, 5D3, and 5D4. The processing of the native message (202D) is discussed below.

The data sources (170) may include one or more data sources (172E) that output data using native messages (202E) in a Hypertext Markup Language (HTML) format.

An example of a native message (202E) is shown in FIG. 5E. The processing of the native message (202E) is discussed below.

The structure of the data sources (172A-172E) may initially be unknown. For example, a native message (202A) of a DSV data source (172A) may include a series of values, and it may initially not be clear whether a particular value is, for example, a telephone number or a numerical lab test result. Even when values are accompanied by labels, when transmitted in DSV format, a correspondence between a value and a label may first need to be established. Further, even when more structured protocols are used, for example, the HL7 FHIR protocol, in one or more embodiments, the values and labels in the native message are treated as if they were unknown, because labels could be wrong, values may have been entered in the wrong field, etc. Accordingly, in one or more embodiments of the disclosure, the native messages (202A-202E), received from the data sources (172A-172E) are extensively processed to identify, with confidence, the content of the native messages. A detailed description is provided below.

The unified electronic heath record database (130), in accordance with one or more embodiments, stores electronic health data provided by the data sources (170), after the processing of the respective native messages (202A-202E) by the message processing engine. The processing, discussed below, involves converting the native messages (202A-202E) into standardized messages (232) compatible with the standard used for the unified electronic health record database (130).

In one embodiment of the disclosure, the Fast Healthcare Interoperability Resources (FHIR) standard, a standard for exchanging healthcare information, is used for the implementation of the unified electronic health record database (130). The FHIR standard is based on state-of-the-art web-based API technology, such as an HTTP-based RESTful protocol, HTML and Cascading Style Sheets for user interface integration. The underlying data representation may be JSON or XML. FHIR is suitable for many types of healthcare related data. For example, FHIR supports clinical resources (e.g., allergies, medications, care plans), identification resources (e.g., patient, location of service, device info), financial resources (e.g., billing, insurance coverage, eligibility), etc. Accordingly, in one or more embodiments, the unified electronic heath record database (130) is used for the centralized aggregation of data received from the data sources (170), including data as heterogenous as patient care demographics, care summaries/plans, document repositories, patient state histories, consent registries, patient and provider registries, clinic data, diagnostic data, therapeutic data, billing data, etc. A record stored in the unified electronic heath record database (130) may be similar in format to the example of the native message (202D), schematically shown in FIGS. 5D1, 5D2, 5D3, and 5D4. Those skilled in the art will appreciate that HL7 FHIR is merely used as an example. Other data models, for example, any kind of financial data model, proprietary health mode, supply chain data model, etc. may be used instead, or in addition.

Once the electronic health data, initially received from the data sources (170) is stored in the unified electronic heath record database (130), searching and accessing the electronic health data is relatively simple. For example, simple HTTP operations may be used to access all data in a uniform format, rather than having to access a multitude of different data sources that may be all implemented using different standards.

The message processing engine (220), in accordance with one or more embodiments of the disclosure, receives the native messages (202A-202E) from the data sources (170A-170E) and converts them into standardized messages (232) that may be stored in the unified electronic health record database (130). The message processing engine, thus, enables consolidation of various health data formats under a single platform.

The message processing engine (220) may include various components including a linear mapper (222), an HL7 to JSON protocol translation engine (224), markup data (226), and a message protocol translation engine (230). Each of these components is subsequently described. The linear mapper (222), the HL7 to JSON protocol translation engine (224), and the message protocol translation engine (230), in accordance with one or more embodiments, include sets of machine-readable instructions (generally stored on a computer-readable medium) which, when executed by the message processing engine (220), perform one or more of the operations described in the flowcharts of FIGS. 6 and 7.

In one or more embodiments, when the message processing engine (220) operates on incoming native messages (202A-202E), markup data (226) is generated. The markup data (226) provides an intermediate representation of the originally obtained native messages (202A-202E). The markup data (226), described below, represents the content of the native messages in a format suitable as an input to the message protocol translation engine, as discussed below. Accordingly, a markup message (228) may represent the content of a native message (202A-202E).

The linear mapper (222), in one or more embodiments, operates on the native messages (202A, 202B) provided by the DSV data source (170A) and/or the database/table data source (170B) to generate markup data (226). The linear mapper uses structural cues to extract content from the native message (202A, 202B) by parsing the native message.

For example, the linear mapper (222) may distinguish separate values or labels in a DSV native message (202A) based on the delimiter (e.g., a comma) separating the values or labels. FIG. 5A shows an example in which a CSV native message (500A) is converted into a markup message (510A). In the example, labels such as "ID", "BIRTHDATE", etc., are recognized using basic assumptions about the structure of the CSV native message (500A). The resulting markup message (510A) includes pairs of labels and corresponding values represented in rows of the markup message (510A). The hierarchy is flat, i.e., the markup message has no depth (where parent data may have child data, etc.).

When operating on a table or database native message (202B), analogous to the operations performed on DSV native messages (202A), labels and values may be extracted by parsing the table or database. Any kind of read or lookup operations may be performed, depending on the type of the table or database. The resulting markup data (226) may include pairs of labels and corresponding values represented in rows of the markup data, similar to the markup data obtained when processing DSV native messages (202A). The hierarchy may be flat, but in case of a database the hierarchy may also include depth. An example of a database native message (500B) is schematically shown in FIG. 5B.

The linear mapper (222), in one or more embodiments, operates on the native messages (202A, 202B) provided by the DSV data source (170A) and/or the database/table data source (170B) to generate markup data (226). The linear mapper uses structural cues to extract content from the native message (202A, 202B) by parsing the native message.

Figure 2:
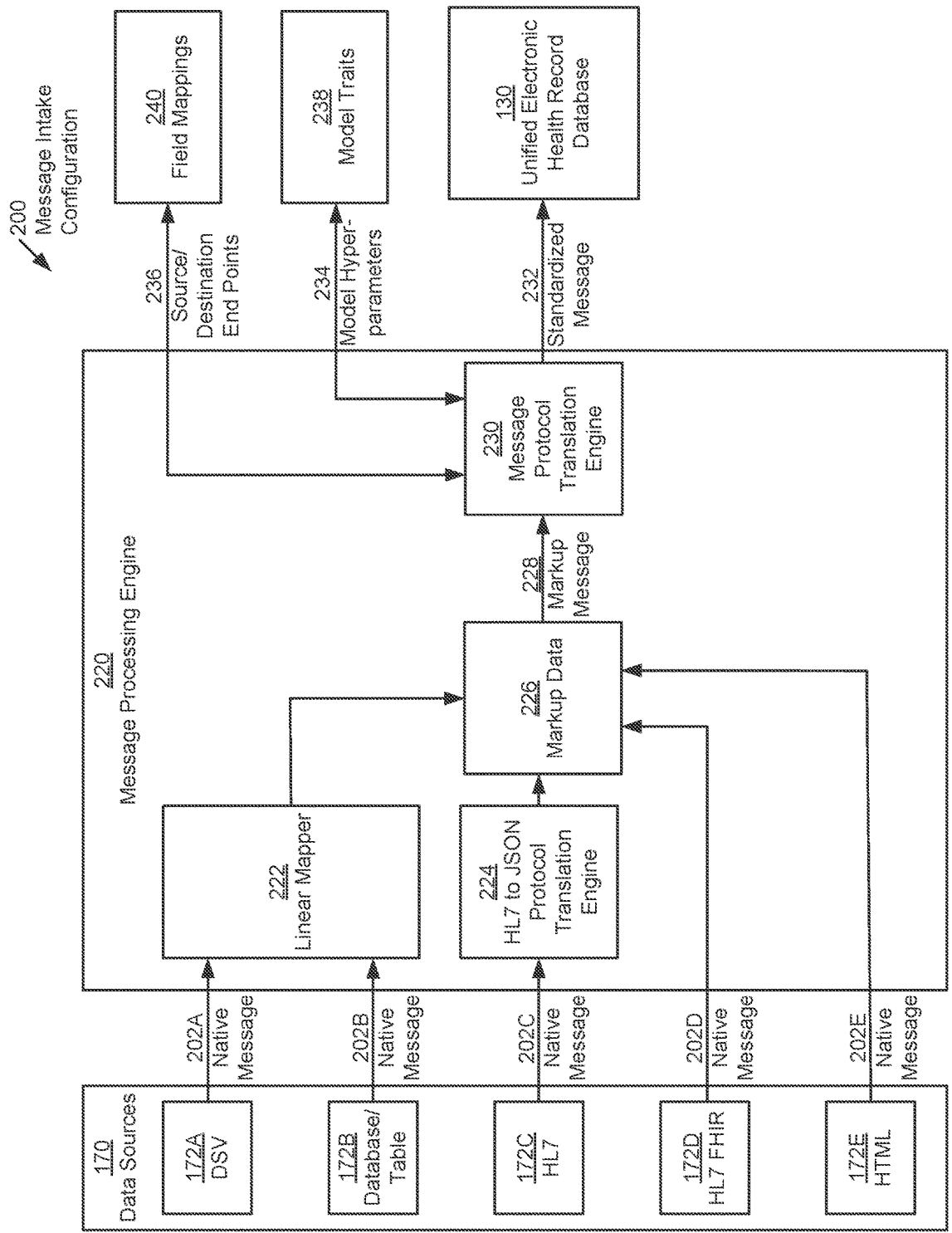
FIG. 2 shows a message intake configuration, in accordance with one or more embodiments of the disclosure.

The HL7 to JSON protocol translation engine (224), in one or more embodiments, operates on the native message (202C) provided by the HL7 data source (170C) to generate markup data (226). The HL7 native message (202C) may have depth (i.e., it may include a hierarchy of grandparent, parent, and child elements). The HL7 to JSON protocol translation engine (224) may take in an HL7 native message (500C) as shown in FIG. 5C1 and break it down by segments, elements, delimiters and escape characters. HAPI (HL7 Application Programming Interface), an object-oriented HL7 2.x parser may be used for the HL7 to JSON protocol translation engine (224). The output may be a hierarchical JSON markup, as illustrated in FIGS. 5C1 and 5C2 showing a markup message (510C) obtained by processing the HL7 native message (500C) by the HL7 to JSON protocol translation engine (224).

The native messages (202D, 202E) for HL7 FHIR and HTML data sources (170D, 170E), in one or more embodiments, already have sufficient structure, allowing them to be used as markup data (226) without requiring translation, directly, or after performing basic linear mappings to the XML or JSON syntax that may be used for the markup data (226). An example of an HL7 FHIR native message (500D1-500D4) is provided in FIGS. 5D1 and 5D4, and a fragment of an HTML native message (500E) is provided in FIG. 5E.

The markup data (226), in accordance with one or more embodiments of the disclosure, represents the native messages (202A-202E) received from the data sources (170A-170E) in a structured format, as previously shown. In one or more embodiments, the markup data (226) has a hierarchical structure that is parsable by the message protocol translation engine (230). Depending on the nature of the received native messages (202A-202E) the markup data (226) may have more or less depth. The markup data (226) may be represented using, for example, XML or JSON syntax. The markup data (226) may be forwarded to the message protocol translation engine (230) in the form of a markup message (228). After the forwarding, the markup data (226) may or may not be stored.

The message protocol translation engine (230), in accordance with one or more embodiments of the disclosure, accepts the hierarchically structured markup message (228) as an input to generate the corresponding standardized message (232) as an output. The standardized message is in a format compatible with the unified electronic health record database (130). In one embodiment of the disclosure, the standardized message (232) is based on the HL7 FHIR standard.

In one or more embodiments, the message protocol translation engine (230) implements a field match model. The field match model establishes mappings between fields in the markup data (226) and fields in the unified electronic health record database (130). This mapping enables data in the markup message (228) to be stored at the proper locations in the unified health record database (130). The appropriate location is established by a field mapping (240) that defines a mapping between a source endpoint and a destination endpoint (236) of the markup message (228) and the standardized message (232), respectively. In one or more embodiments, field mappings (240) are initially assumed to be unknown. This enables the processing of native messages with data values that are poorly or incorrectly labeled. In other words, the message protocol translation engine does not merely rely on a label in the markup data message (228) to identify a corresponding data value in the markup data message. In a training phase of the message protocol translation engine (230), the field mappings (240) are learned based on initially provided training data that includes sets of native messages (170). Once the field mappings are learned, they are stored and may enable rapid translation of an incoming markup message (228) into a standardized message (232). The field mappings may be stored as an in-memory snapshot and/or in a database, e.g., a relational database that explicitly maps single fields of the markup message to FHIR endpoints of the unified electronic health record database (130). Some fields may be composite and would have single to many mappings.

In one or more embodiments, the message protocol translation engine relies on machine learning to acquire the field mappings. The statistical nature of the employed models enables a quality check of the field mappings (240). For example, when a confidence threshold is not reached for a field mapping, the affected fields may be flagged or tagged as being below the confidence of quality threshold, to enable an administrator to manually review these fields. The review or another form of post-processing may be performed at a different time, without disrupting the operation of the message protocol translation engine. The administrator may set the desired field mapping using, for example, a pick list.

Hyperparameters (234) may be used to parameterize the underlying machine learning models and may be stored in a database for model traits (238). A detailed description of the components of the message protocol translation engine (230) and its operation is subsequently provided.

Figure 3:
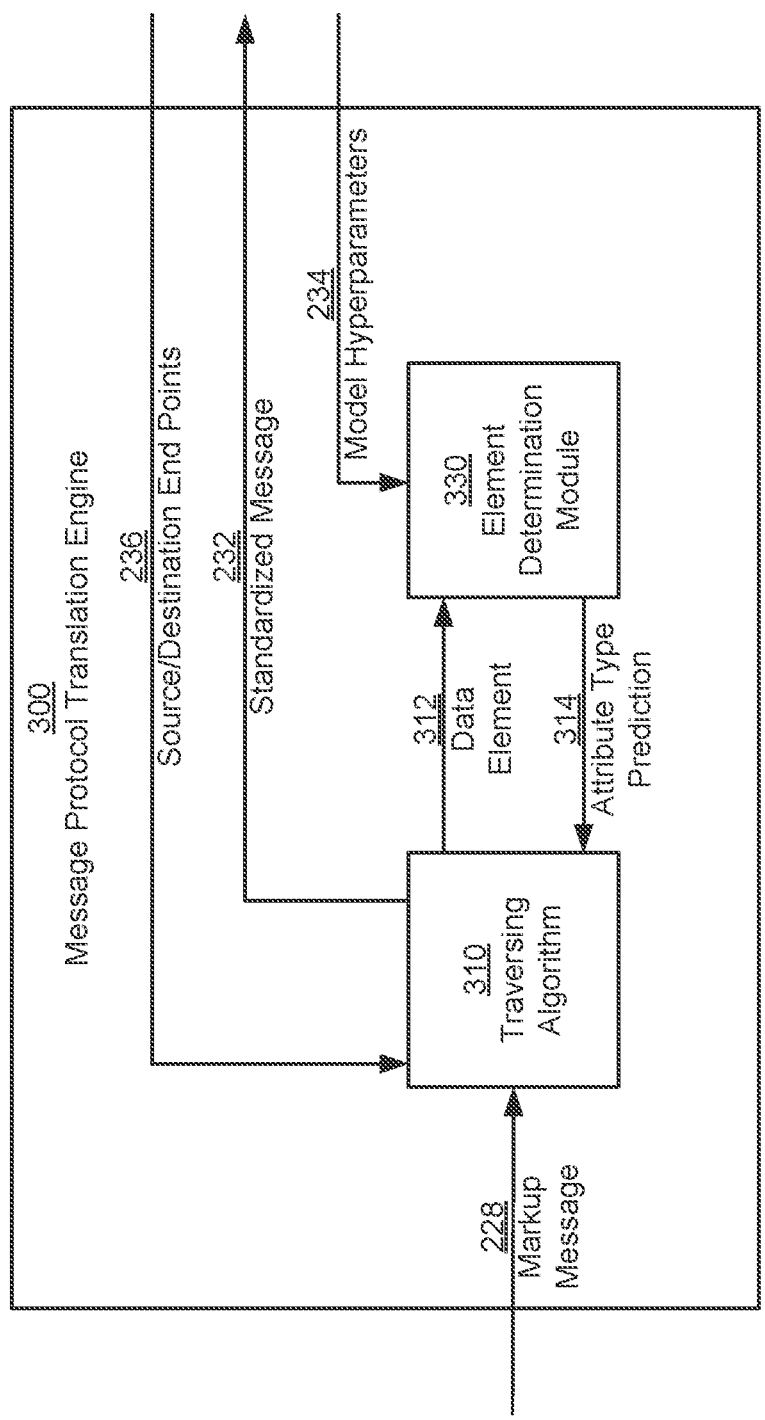
FIG. 3 shows a message protocol translation engine, in accordance with one or more embodiments of the disclosure.

Turning to FIG. 3, a message protocol translation engine (300), in accordance with one or more embodiments of the disclosure, is shown. The message protocol translation engine (300) may correspond to the message protocol translation engine (230), introduced in FIG. 2. The message protocol translation may include a traversing algorithm (310) and an element determination module (330). The element determination module (330) in coordination with the traversing algorithm (310) recursively processes a markup message (228) to translate it into a standardized message (232) by determining mappings between data elements of the markup message and data elements of the standardized message as it may be stored in the unified electronic health record database (130).

The traversing algorithm (310) may identify the data elements (312) of the markup message (228) by recursively parsing the markup message (228). The traversing algorithm may then forward the isolated data elements (312) to the element determination module (330). A machine learning algorithm of the element determination module (330) may operate on the data elements (312) to predict element types (314) for the data elements (312). These operations, performed by the traversing algorithm (310) and the element determination module (330), are provided by sets of machine-readable instructions (stored on a computer-readable medium) which, when executed by the message processing engine (220), perform one or more of the operations described in the flowcharts of FIGS. 6 and 7, as described below.

Figure 4:
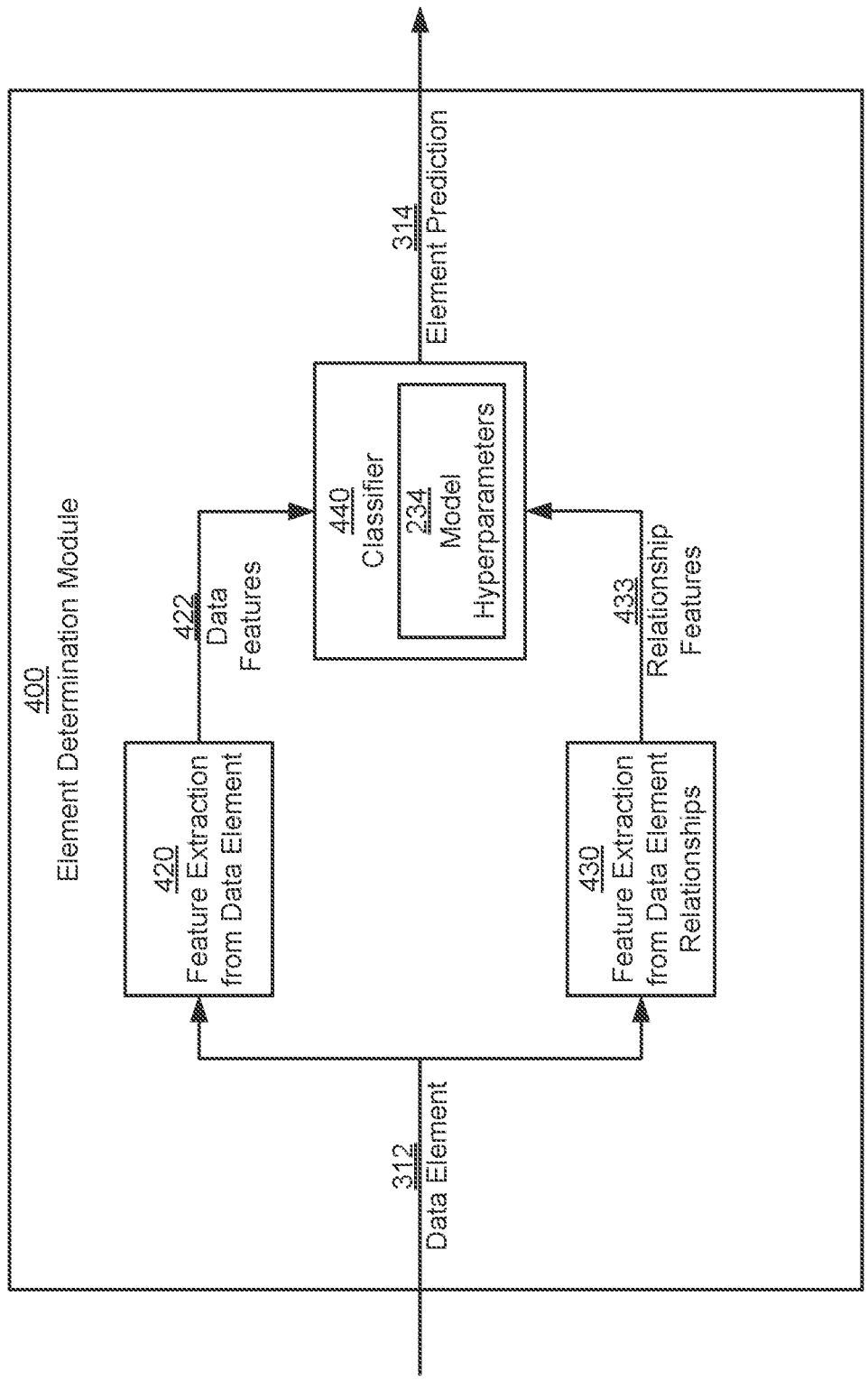
FIG. 4 shows an element determination module, in accordance with one or more embodiments of the disclosure.

Turning to FIG. 4, an element determination module (400), in accordance with one or more embodiments of the disclosure, is shown. The element determination module (400) may correspond to the element determination module (330), introduced in FIG. 3. In one or more embodiments, to make element predictions (314), the element determination module (400) employs a classifier (440) operating on data features (422) and/or relationship features (433). The data features (422) may be generated from the data element (312) by a feature extraction from the data element (420). The relationship features (433) may be generated from the data element (312) and other data elements that are related to the data element (312) by a feature extraction from data element relationships (430). Each of these elements is subsequently discussed.

The feature extraction from the data element (420) includes machine-readable instructions (stored on a computer-readable medium) which, when executed by the message processing engine (220), identify or obtain one or more of the subsequently described features from the data element (312):

(a) Systematized Nomenclature of Medicine-Clinical Terms (SNOMED CT) or International Classification of Diseases (ICD) Code Matching: The data element may include a SNOMED CT code or an ICD code which may be recognized as such. If the data element includes a text, the text may be sent to a natural language processing (NLP) engine which may return matched SNOMED CT codes and ICD codes found in the text. When a SNOMED CT code or an ICD code is found, an appropriate feature flag may be set. For example, if a medication SNOMED code is found, then "medication present" may be set to 1; when a procedure SNOMED code is found, then "procedure conducted" may be set to 1.

(b) Alphanumeric with leading character: Medical record numbers (MRNs) may be prefixed with a character (e.g. M000324587). A regular expression for character-leading alphanumeric data elements may be used. When a match is found, "lead_char_with_number" may be set to 1. Presence of an MRN may suggest that the data element is an identifier for a medical record.

(c) When a data element matches a date pattern, or when the number can be interpreted as a date number (e.g., 20080901143500) then "date_formatting_present" may be set to 1.

(d) Temporal comparisons: For a data element obtained from a message, preceding and subsequent messages may be scanned for the data elements at the same location in the messages. By comparing these data elements, one may determine whether the data elements are changing in a standard pattern.

(i) A data element, over consecutive messages, may be increasing linearly. Accordingly, the data element may be assumed to be a counter or an index. "linear_increment" may be set to 1.

(ii) A data element, over consecutive messages, may be generally the same or may stay within a range, suggesting that the data element is a measurement value. "measurement_value" may be set to 1. In addition, a statistical analysis of the data elements observed over multiple messages may be conducted to determine the mean, median, and/or standard deviation, which may serve as an additional feature. Further, the median or mean combined with the standard deviation may be used to match against known measurements to then recommend feature matching based on the value range (e.g. a clinical lab value may generally be in a characteristic range).

These features have in common that they are based on the data element alone, without requiring information about or from other data elements. The features may be expressed using one or more words, numbers, strings, integers, floats, etc.

The feature extraction from the data relationships (430) includes machine-readable instructions (generally stored on a computer-readable medium) which, when executed by the message processing engine (220), identify or obtain one or more of the subsequently described features from the data element (312). As further described below with reference to the flowcharts, the relationship of data elements in a message may be determined when recursively processing the message. For example, the child, sibling and/or parent data elements of a particular data element may be determined. Features that are based on these relationships may be determined by a feature extraction from data element relationships (430):

(a) Individual and group characteristics of children elements may be a source of the features. These may include, for example, the number of child elements, the maximum child element data length, the minimum child element data length, the most dominant data type, whether children have a direct relationship, whether children are part of a list, whether the number of child elements is identical for all children, whether child attributes contain SNOMED terms, whether child attributes contains dates, whether child attributes contain text exceeding, for example 100 characters, etc.

(b) Individual characteristics of adjacent elements may be extracted as features. These features may include the number of sibling elements, the maximum sibling element data length, the minimum sibling element data length, the proportion of sibling with child elements (a sibling element may or may not have child elements), detection of a repeated data value between siblings, incrementing/decrementing numerical sibling value, increasing/decreasing sibling value, etc.

These features have in common that they are based on relationships between data elements, rather than being based on the data element alone. In an iterative implementation, features that are initially extracted may serve as additional context for subsequent executions of the feature extraction, thereby facilitating the identification of previously unidentified data elements.

The classifier (440), in accordance with one or more embodiments of the disclosure, is trained to perform classifications of the data elements (312) obtained from the markup data. The classification of the data element identifies an appropriate location for the data element in the unified electronic health record database (130). For example, when the classifier (440) identifies a data element that contains blood pressure measurements, the data element would be mapped to a location in the unified electronic health record where blood pressure measurements would be stored. In other words, the classifier may establish a field mapping between source end points and destination endpoints, with the source endpoints representing locations of data elements in the markup data, and with the destination endpoints representing locations of data elements in the unified electronic health record database.

Training and/or retraining may be performed as new or additional training data become available. The classifier (440) may be trained based on samples of markup messages or markup message samples and corresponding elements within the unified electronic health record. Many samples, for example, >10,000 samples may be used. A certain threshold may be set (e.g., confidence interval of 95%), where if the prediction sits outside of the confidence interval, the segments are flagged, and a human interpretation will be used to establish the classification to replace the poor prediction. A retraining may be performed using batches of training data (e.g., based on data gathered during a week). Alternatively, a retraining may be performed whenever new data element becomes available, and when the prediction made by the classifier for the new data element is unsatisfactory, thus requiring human intervention. In this case, the retraining may be performed based on the input provided by the administrator when manually establishing the field mapping for the new data element. After completion of the training, the parameters and hyperparameters used for the training may be stored, and the obtained field mappings may be stored for data element location within the standardized message.

An additional description of the operation of the classifier, along with examples, is provided below with reference to FIGS. 6 and 7.

Various types of classifiers (440) may be used without departing from the disclosure, and the choice of the type of classifier that is actually used may depend on the performance of the different types of classifiers. Classifier types that may be used include but are not limited to logistic regression classifiers, naive Bayes classifiers, random forest classifiers, gradient boosting classifiers, recurrent neural networks and transformers.

In one embodiment of the disclosure, a transformer classifier is used. The transformer in comparison to recurrent neural networks (RNN) is less prone to suffering from the vanishing gradient problem which is characteristic of networks using gradient-based optimization techniques (i.e., reduced efficacy due to the earlier layers learning being slower than the learning of later layers as a result of temporal information decay).

The transformer architecture which relies on a self-attention (intra-attention) mechanism, thereby eliminating the recurrent operations computed in Recurrent Neural Networks, may be used to compute the latent space representation of both the encoder and decoder sides. Positional encoding is added to the input and output embeddings with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder and decoder and each layer is built of two sublayers: (1) a multi-head self-attention layer and (2) a position-wise feed-forward network (FFN) layer. The multi-head sub-layer enables the use of multiple attention functions with an equivalent cost of utilizing attention, while the FFN sub-layer uses a fully connected network to process the attention sublayers. The FFN applies two linear transformations on each position and a ReLU (Rectified Linear Unit) which extends the self-attention mechanism to efficiently consider representations of the relative positioning (i.e., distances between sequence elements). An efficient implementation of a relation-aware self-attention mechanism is, thus, achieved. The transformer classifier may be trained using methods of supervised learning when the input/output is a sequence. The transformer, when classifying data elements (312), may account for long sequences.

While FIGS. 1, 2, 3, and 4 show configurations of components, other configurations may be used without departing from the scope of the disclosure. For example, various components may be combined to create a single component. As another example, the functionality performed by a single component may be performed by two or more components.

FIGS. 5A, 5B, 5C1, 5C2, 5D1, 5D2, 5D3, 5D4, and 5E provide examples of various messages, in accordance with one or more embodiments of the disclosure. The processing of these messages is described below with reference to the flowcharts.

FIG. 5A shows an example of a Comma Separated Value (CSV) native message (500A) and an example of a markup message (510A), in accordance with one or more embodiments of the disclosure. The markup message (510A) may have been generated by the processing of the native message (500A) by the linear mapper (222).

FIG. 5B schematically shows an example of a database native message (500B), in accordance with one or more embodiments of the disclosure. The database native message (500B) may be processed by the liner mapper (222) to obtain a corresponding markup message.

FIG. 5C1 shows an example of a Health Level 7 (HL7) native message (500C) and FIG. 5C2 shows and example of a markup message (510C), in accordance with one or more embodiments of the disclosure. The markup message (510C) may have been generated by the processing of the native message (500C) by the protocol translation engine (224).

FIGS. 5D1, 5D2, 5D3, and 5D4 show an example of an HL7 Fast Healthcare Interoperability Resources (FHIR) native message (500D1, 500D2, 500D3, 500D4), in accordance with one or more embodiments of the disclosure. No processing may be necessary to obtain a corresponding markup message.

FIG. 5E shows a partial Hypertext Markup Language (HTML) native message, in accordance with one or more embodiments of the disclosure. No processing may be necessary to obtain a corresponding markup message.

Figure 6:
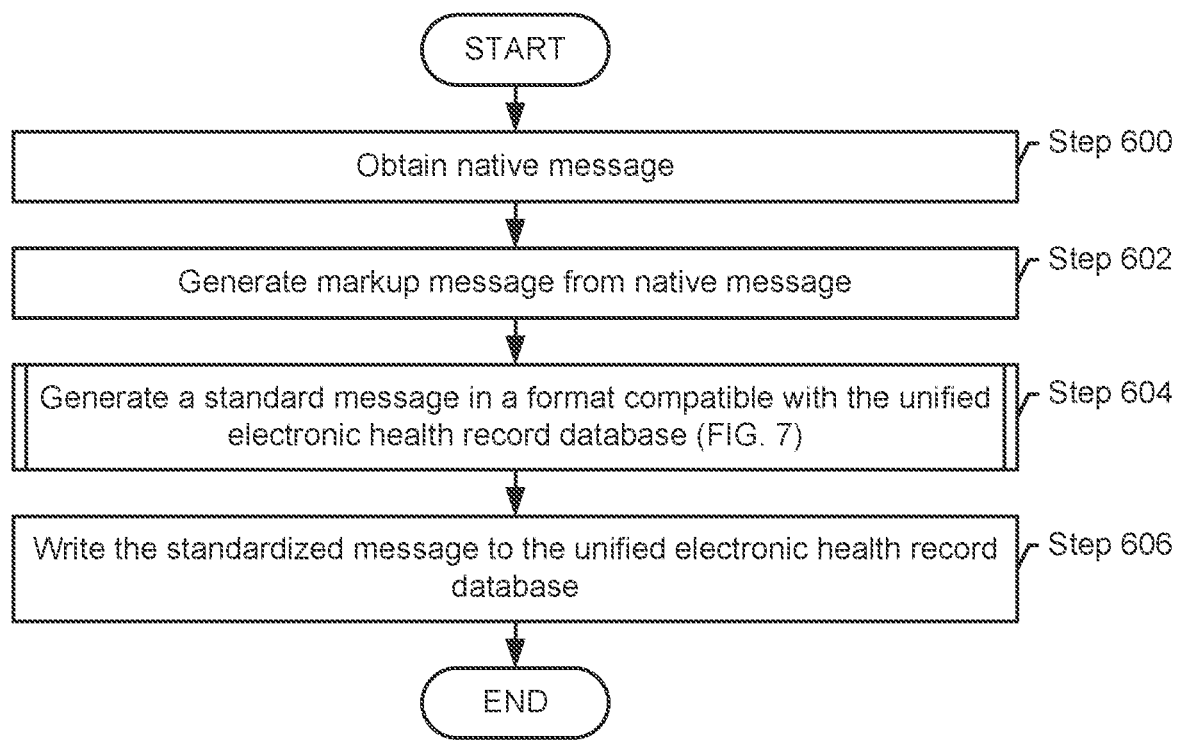
FIG. 6 shows a flowchart describing the writing of electronic health record data to a unified electronic health record database, in accordance with one or more embodiments of the disclosure.
Figure 7:
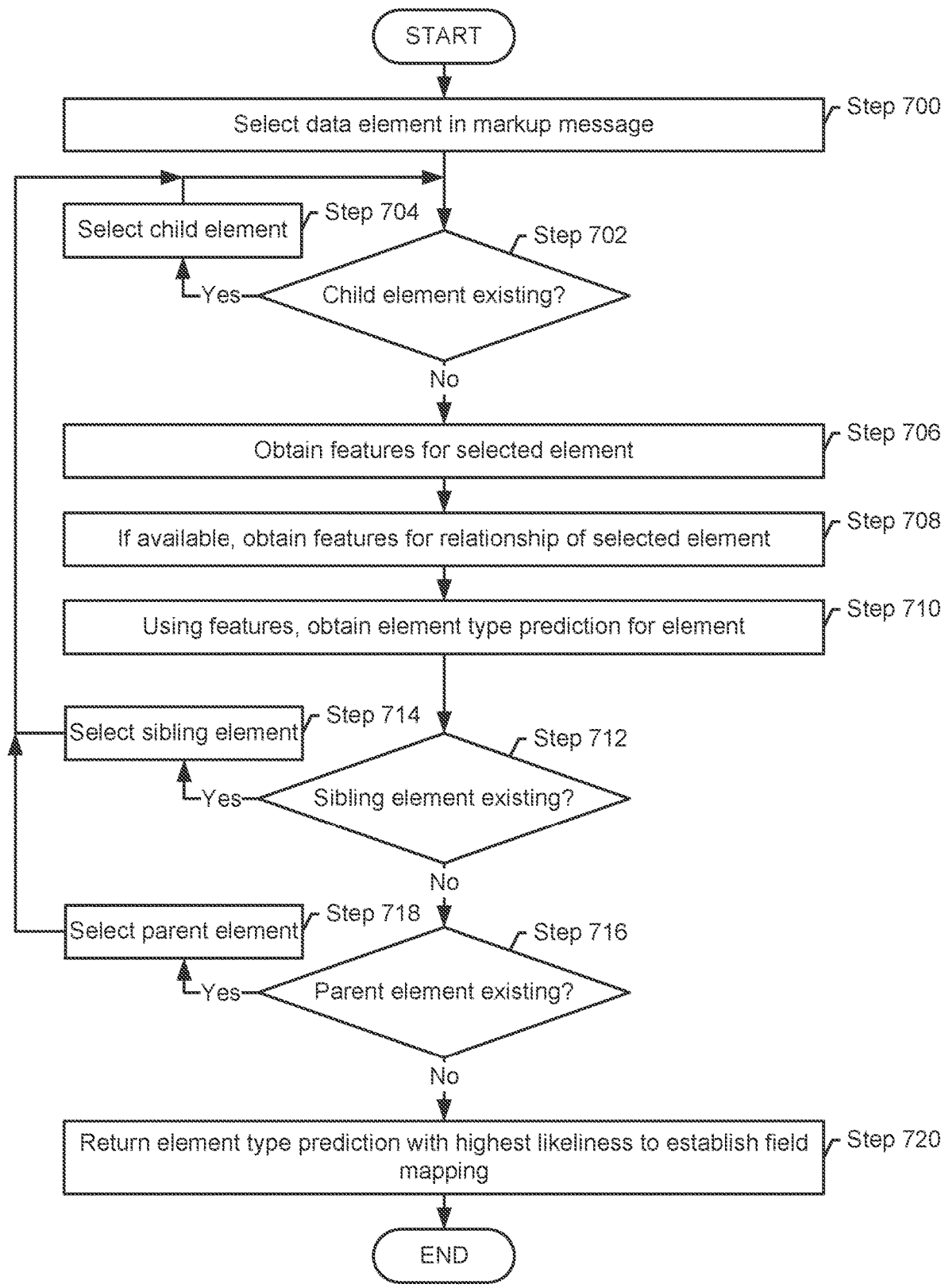
FIG. 7 shows a flowchart describing the generation of a standardized message compatible with the unified electronic health record database, in accordance with one or more embodiments of the disclosure.

FIGS. 6 and 7 show flowcharts in accordance with one or more embodiments of the disclosure. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

To illustrate various steps of the subsequently described method, assume that the following fragment of a markup message is being processed by the method:

```
"telecom": [
  {
    "system": "phone",
    "value": "0648352638",
    "use": "mobile"
  },
  {
    "system": "email",
    "value": "p.heuvel@gmail.com",
    "use": "home"
  }
],
"gender": "male",
```

Turning to FIG. 6, a flowchart describing a method for the writing of electronic health record data to a unified electronic health record database, in accordance with one or more embodiments of the disclosure, is shown. The method may be executed whenever a native message is received from a data source. Many native messages may be received from a data source, for example, when performing an automatic outbound integration from a hospital network to the unified electronic medical record database. The native messages may be received as individual messages in a real-time data feed, or in batches.

In Step 600, a native message is obtained. The native message may be received from any remote or local data source sending the native message, as previously described. Further, the native message may be in any data format. The format of the received native message may resemble one of the native messages shown in FIGS. 5A, 5B, 5C1, 5D1, 5D2, 5D3, 5D4, and 5E.

In Step 602, markup data are generated from the native message. Depending on the format of the native message, different steps may be performed to generate the markup data. For DSV-type native messages, databases, and tables, a linear mapper may translate the data elements of the native message into the hierarchical structure of the markup data, as previously discussed. For HL7-type native messages, an HL7 to JSON protocol translation engine may translate the data elements of the native message into the hierarchical structure of the markup data, as previously discussed. For HL7 FHIR and HTML-type native messages, no particular translation may be necessary to obtain the hierarchical structure of the markup data. Examples for markup data are provided in FIGS. 5A and 5C2. The markup data may subsequently be sent to the message protocol translation engine in a markup message.

In Step 604, a standard message in a format compatible with the unified electronic health record database is generated from the markup message. A machine learning algorithm, recursively operating on the data elements of the markup message may be used. The details are provided below in FIG. 7.

In Step 606, the standardized message, once all of its data elements have been translated in Step 604, is written to the unified electronic health record database.

Turning to FIG. 7, a flowchart describing a method for the generation of a standardized message compatible with the unified electronic health record database, in accordance with one or more embodiments of the disclosure, is shown.

The method includes a recursive algorithm that defers a final element prediction for a data element of the markup message until a recursive callback dataset is received. Depending on the depth of the hierarchy of data elements, several iterations may be performed. Consider the previously introduced markup message fragment. The markup message fragment includes two top-level data elements identified by the attributes "telecom" and "gender". The data element identified by "gender" has no children. The value is "male". In contrast, the data element identified by "telecom" has children. Accordingly, the value associated with the attribute "telecom" includes the children. The children are siblings. The subsequently discussed steps reflect the recursive operation of the machine learning algorithm.

In Step 700, a data element is selected in the markup message. The selection may be performed based on the hierarchical structuring of the markup message, and initially the selected data element may be the first data element discovered in the markup message. In the example of the previously introduced markup message fragment, the first data element is the data element with the attribute "telecom".

In Step 702, a test is performed to determine whether the selected data element has children. If at least one child element exists, the method may proceed with Step 704 to select the child element for further processing. If no child element is found, the method may proceed with Step 706. If Step 704 is performed, certain features may be triggered. For example, a feature that says that the child element has an encounter object as a parent; a feature that says that the child element is a sub-element of a list parent, a feature that says the child element has a patient object as a parent, etc. In the example of the previously introduced markup message fragment, the selected data element has children. These children represent phone and email contact information.

Through the execution of Steps 702 and 704, the bottom of the hierarchy in the markup message may be reached, regardless of the depth of the hierarchy. Steps 702 and 704 may be performed by the traversing algorithm operating on the markup message. Once the method proceeds to Step 706, the traversing algorithm passes the selected data element to the element determination module.

In Step 706, features are obtained for the data element. A multitude of features may be obtained, as previously described. Referring to the previously introduced example, assume that features are obtained for the data element "system": "phone", which is the bottom-most data element that would be processed first.

In Step 708, features are obtained for known relationships of the data element. A multitude of features may be obtained, as previously described. The relationship features being obtained are based on known relationships such as sibling date elements, child data elements, etc. Referring to the previously introduced example, assume that an attempt is made to obtain relationship features for the data element "system": "phone". No relationship features may initially be obtained because the siblings are still unknown. Next, assume that in a subsequent execution of Step 708, the date element "value": "0648352638" is processed to determine relationship features. A known relationship between "system": "phone" and "value": "0648352638" now exists based on these data element being siblings. Accordingly, relationship features may be obtained.

In Step 710, using the features obtained in Step 706 and/or Step 708, an element type prediction is performed for the data element. The prediction may be performed by the classifier, as previously discussed. In one or more embodiments, the element type prediction includes the confidence for the classes available for prediction. A confidence for all of the classes, or only for the more likely classes may be returned.

Referring to the previously introduced example, assume that the element type prediction is initially performed for the data element "system": "phone", i.e., for the attribute "system" accompanied by the value "phone", based on the features obtained in Step 706. No relationship features are available. The prediction may have a low confidence, based on the availability of only features directly derived from "system": "phone". The prediction may be, for example, that the data element relates to phone number with 40% confidence, and that the data element relates to a free text with 27% confidence. Next, assume that the sibling data element "value": "0648352638" is used for a prediction in a subsequent execution of Step 710. The available features would now also include relationship features (based on the relationship between "value": "0648352638" and "system": "phone"), and in addition, the presence of "0648352638" increases the likeliness of the data element representing a phone number. As a result, the prediction is likely to become significantly more accurate. The prediction may indicate a high confidence for a phone number, whereas the confidence for free text may drop. Data values such as "mobile", "cell", "phone", "cellphone", and "remote" were found to be particularly effective when making predictions to determine data labels.

In Step 712, a test is performed to determine whether a sibling element is existing. If a sibling element exists, the method may proceed to Step 714 to select the sibling element for further processing. The selection of the sibling element enables the above described processing of relationship features.

In Step 716, a test is performed to determine whether a parent element is existing. If a parent element exists, the method may proceed to Step 718 to select the parent element for further processing. The selection of the parent element enables the above described processing of relationship features with additional information.

In Step 720, the element type prediction with the highest likeliness (based on the confidence associated with the prediction) is returned. In the previously introduced example, the returned prediction would be that the data element contains a phone number. If the confidence does not reach a previously specified threshold, e.g. 95%, an administrator may be asked to review the data element.

The recursive processing of a data element as described provides increasingly more information to accurately predict an element type of the data element, as information from related data elements becomes available. While initially a prediction may be poor, with the availability of additional information from siblings, parents, etc., the prediction may become increasingly accurate. To further process the markup message, another top-level data element may subsequently be selected to repeat the described steps. This may continue until element types have been predicted for all data elements of the entire markup message.

When the entire markup structure receives a low confidence rating, it could trigger a number of options 1) a re-processing with the predictions from the first pass as a bias; 2) a postponing of the processing and a processing of the next (n+1) message in the queue to use its results to bias the re-processing of this message (n); 3) a discarding of the data set due to quality outlier weightings (for example, if confidence average was under 15%, the message may not be considered, e.g., for future predictions)

Embodiments of the disclosure may be used in various scenarios. Embodiments of the disclosure may be particularly beneficial when used for an outbound integration from a hospital network to a unified electronic health record database. The integration may be performed largely without human supervision. Due to the use of confidence values when predicting element types for data elements, erroneous data elements are likely to be detected. When generating a standardized message from a native message, no static field mappings are assumed, and erroneous values may, thus, be caught when the values obtained from the native message are processed by the machine learning model. Accordingly, the quality of a data migration may increase, while the associated cost (financial cost, time, etc.) may decrease.

Embodiments of the disclosure may be combined with other methods such as optical character recognition (OCR) and/or natural language processing (NLP) to process paper-based electronic health records and/or messages that are unstructured. Further, while a translation from a native message to a standardized message was discussed, embodiments of the disclosure may also be used for other translations. Specifically, once the message processing engine including the machine learning models has been trained, it may perform translations in other directions. For example, a standardized message may be translated, in a similar manner, to a native message, or a native message in a first format (e.g. DSV) may be translated to a native message in a second format (e.g. HTML) using the standardized message format as an intermediate step.

Embodiments of the disclosure enable the implementation of applications that benefit from or even require the rapid availability of a broad spectrum of health data in a uniform electronic health record database.

Figure 8A:
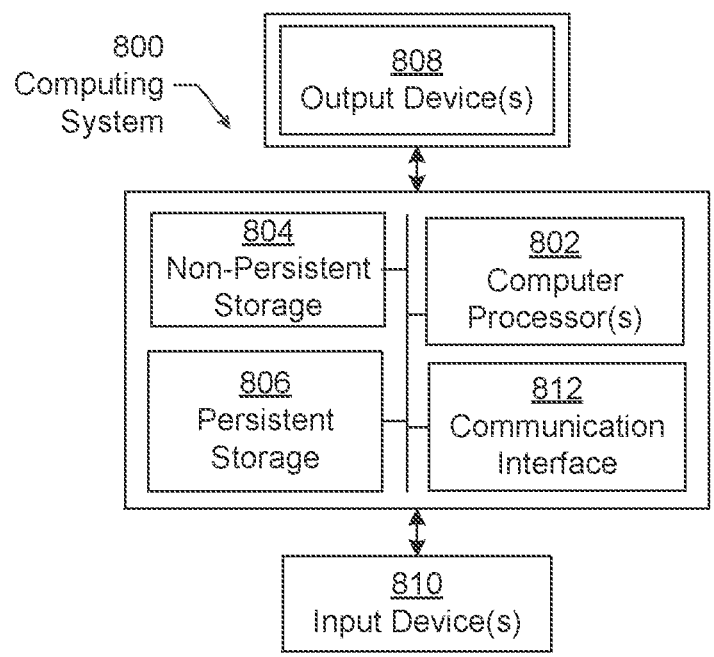
FIGS. 8A and 8B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 8B:
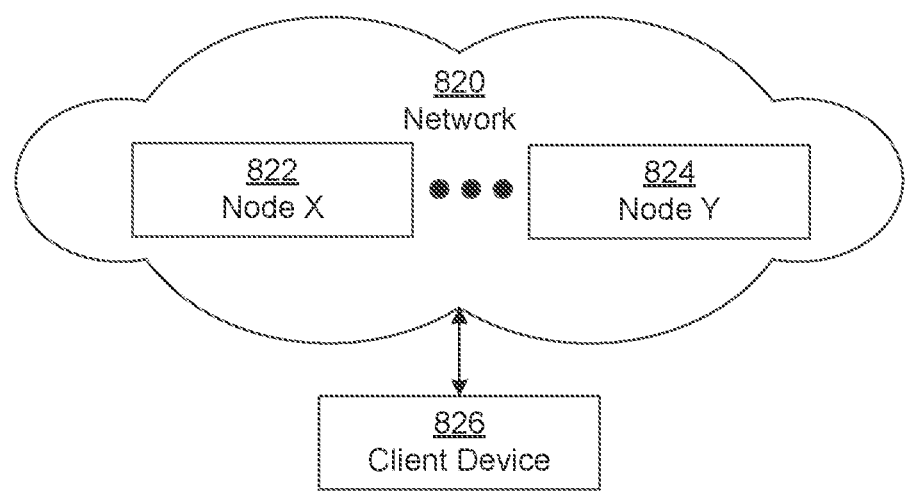

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the disclosure.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for consolidating heterogenous electronic health data, the method comprising:
   obtaining a native message comprising a plurality of data elements;
   generating a markup message comprising the plurality of data elements in a hierarchical structure;
   generating a standardized message that represents the plurality of data elements in a format of a unified electronic health record database by:
      recursively applying a machine learning model to the plurality of data elements, based on the hierarchical structure to determine a mapping between the plurality of data elements in the markup message and the plurality of data elements in the standardized message; and
   writing the standardized message to the unified electronic health record database.

2. The method of claim 1, wherein recursively applying the machine learning model comprises:
   in the hierarchical structure of the markup message, selecting a first data element of the plurality of data elements;
   identifying a second data element of the plurality of data elements based on:
      the second data element being a child of the first data element, and
      the second data element having no children;
   for the second data element, obtaining a plurality of features;
   predicting an element type of the second data element based on the plurality of features and using the machine learning model;
   based on the predicted element type, establishing the mapping for the second data element in the markup message to the standardized message; and
   adding the second data element to the standardized message.

3. The method of claim 2, wherein recursively applying the machine learning model further comprises, after predicting the element type of the second data element:
   for the first data element, obtaining a plurality of features, wherein the plurality of features for the first data element comprises the predicted element type of the second data element; and
   predicting an element type of the first data element.

4. The method of claim 2, wherein the features comprise at least one selected from:
   a Systematized Nomenclature of Medicine-Clinical Terms (SNOMED CT) code,
   an International Classification of Diseases (ICD) code,
   an alphanumeric code with a leading character,
   a date, and
   an engineered temporal comparison of a same location in the native message, preceding native messages and succeeding native messages.

5. The method of claim 2, wherein recursively applying the machine learning model further comprises, after predicting the element type of the second data element:
   identifying a third data element of the plurality of data elements, wherein the third data element is a sibling of the second data element;
   predicting an element type of the third data element; and wherein the plurality of features used for predicting the element type of the second data element further comprises the element type of the third data element.

6. The method of claim 1, wherein recursively applying the machine learning model comprises determining features expressing relationships between the plurality of data elements, wherein the relationships are obtained by the recursive application of the machine learning model.

7. The method of claim 6, wherein the features comprise at least one selected from:
a number of child elements,
a maximum child element data length,
a minimum child element data length,
a most dominant data type,
a number of sibling elements,
a maximum sibling element data length,
a minimum sibling element data length, and
a proportion of sibling with child elements.

8. The method of claim 1, wherein the machine learning model is one selected from:
a logistic regression classifier,
a naive Bayes classifier,
a random forest classifier,
a gradient boosting classifier,
a recurrent neural network, and
a transformer classifier.

9. The method of claim 1, wherein recursively applying the machine learning model to the plurality of data elements comprises:
obtaining, for the mapping between one of the plurality of data elements in the markup message and one of the plurality of data elements in the standardized message a confidence level;
comparing the confidence level against a confidence threshold;
accepting the mapping, when the confidence level exceeds the confidence threshold; and
obtaining the mapping from an administrator based on a review of the mapping by the administrator when the confidence level does not exceed the confidence threshold.

10. The method of claim 9, further comprising:
retraining the machine learning model using the mapping obtained from the administrator.

11. The method of claim 1, wherein the native message is one selected from:
a delimiter separated value (DSV) message,
a database,
a table,
a Health Level Seven (HL7) message,
an HL7 Fast Healthcare Interoperability Resources (FHIR) message, and
a Hypertext Markup Language (HTML) message.

12. A system for consolidating heterogenous electronic health data, the system comprising:
a computer processor configured to perform operations comprising:
obtaining a native message comprising a plurality of data elements;
generating a markup message comprising the plurality of data elements in a hierarchical structure;
generating a standardized message that represents the plurality of data elements in a format of a unified electronic health record database by:
recursively applying a machine learning model to the plurality of data elements, based on the hierarchical structure to determine a mapping between the plurality of data elements in the markup message and the plurality of data elements in the standardized message; and
writing the standardized message to the unified electronic health record database.

13. The system of claim 12, wherein the instructions further comprise:
in the hierarchical structure of the markup message, selecting a first data element of the plurality of data elements;
identifying a second data element of the plurality of data elements based on:
the second data element being a child of the first data element, and
the second data element having no children;
for the second data element, obtaining a plurality of features;
predicting an element type of the second data element based on the plurality of features and using the machine learning model;
based on the predicted element type, establishing the mapping for the second data element in the markup message to the standardized message; and
adding the second data element to the standardized message.

14. A non-transitory computer readable medium comprising computer readable program code for causing a computer system to:
obtain a native message comprising a plurality of data elements;
generate a markup message comprising the plurality of data elements in a hierarchical structure;
generate a standardized message that represents the plurality of data elements in a format of a unified electronic health record database by:
recursively applying a machine learning model to the plurality of data elements, based on the hierarchical structure to determine a mapping between the plurality of data elements in the markup message and the plurality of data elements in the standardized message; and
write the standardized message to the unified electronic health record database.

15. The non-transitory computer readable medium of claim 14, wherein the computer readable program code further causes the computer system to:
in the hierarchical structure of the markup message, select a first data element of the plurality of data elements;
identify a second data element of the plurality of data elements based on:
the second data element being a child of the first data element, and
the second data element having no children;
for the second data element, obtain a plurality of features;
predict an element type of the second data element based on the plurality of features and using the machine learning model;
based on the predicted element type, establish the mapping for the second data element in the markup message to the standardized message; and
add the second data element to the standardized message.

16. The non-transitory computer readable medium of claim 15, wherein the features comprise at least one selected from:
a Systematized Nomenclature of Medicine-Clinical Terms (SNOMED CT) code, and
an International Classification of Diseases (ICD) code.

* * * * *